United States Patent
Eberhardt et al.

(10) Patent No.: US 7,036,335 B2
(45) Date of Patent: May 2, 2006

(54) PNEUMATICALLY ACTUATED MULTI-WAY VALVE AND REFRIGERATING MACHINE WITH MULTI-WAY VALVE

(75) Inventors: Hans-Frieder Eberhardt, Giengen-Burgberg (DE); Michael Neumann, Ulm (DE); Udo Wenning, Giengen/Brenz (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/873,476

(22) Filed: Jun. 21, 2004

(65) Prior Publication Data

US 2005/0005633 A1    Jan. 13, 2005

Related U.S. Application Data

(63) Continuation of application No. PCT/EP02/13880, filed on Dec. 6, 2002.

(30) Foreign Application Priority Data

Dec. 19, 2001   (DE) ................................ 101 62 499

(51) Int. Cl.
   *F25B 1/00*   (2006.01)
(52) U.S. Cl. ...................................... 62/498; 137/625.5
(58) Field of Classification Search ............... 62/210, 62/222, 498, 511; 137/625.48, 625.5; 251/61.3

See application file for complete search history.

(56) References Cited

U.S. PATENT DOCUMENTS

| 862,867 A | * | 8/1907 | Eggleston ................... 417/390 |
| 2,885,173 A | | 5/1959 | Dobrick |
| 3,430,437 A | * | 3/1969 | Bettoni et al. ................ 60/290 |
| 4,267,947 A | * | 5/1981 | Wasserstrom ............... 222/399 |
| 4,641,686 A | * | 2/1987 | Thompson ............. 137/625.65 |
| 4,850,807 A | * | 7/1989 | Frantz .......................... 417/63 |
| 5,038,827 A | * | 8/1991 | Heffner et al. .............. 137/627 |
| 5,181,656 A | * | 1/1993 | Schwerdt ..................... 237/8 C |
| 5,848,608 A | * | 12/1998 | Ishigaki ................. 137/599.16 |
| 6,233,957 B1 | * | 5/2001 | Hirao et al. ................ 62/228.3 |

FOREIGN PATENT DOCUMENTS

| DE | 33 16 258 A1 | | 11/1984 |
| EP | 0581974 A1 | * | 2/1994 |
| FR | 672.776 | | 1/1930 |
| GB | 2 027 849 A | | 2/1980 |
| GB | 2252163 A | * | 7/1992 |

* cited by examiner

*Primary Examiner*—Mohammad M. Ali
(74) *Attorney, Agent, or Firm*—John T. Winburn; Russell W. Warnock; Craig J. Loest

(57) ABSTRACT

A multi-way valve, in particular for use in the refrigerant circuit of a refrigeration unit, includes a housing with several inlets and outlets and a chamber with several seats that are respectively allocated to one inlet or outlet. A closing member is allocated to each seat. The closing members are coupled to a cell that can be expanded and compressed by the action of a control pressure to block or release the allocated seat in accordance with the compression or expansion of the cell. A gas generator and absorber can be housed in the cell for generating the control pressure.

21 Claims, 2 Drawing Sheets

PNEUMATICALLY ACTUATED MULTI-WAY VALVE AND REFRIGERATING MACHINE WITH MULTI-WAY VALVE

CROSS-REFERENCE TO RELATED APPLICATION

This application is a continuation, under 35 U.S.C. § 120, of copending international application No. PCT/EP02/13880, filed Dec. 6, 2002, which designated the United States; this application also claims the priority, under 35 U.S.C. § 119, of German patent application No. 101 62 499.9, filed Dec. 19, 2001; the prior applications are herewith incorporated by reference in their entirety.

BACKGROUND OF THE INVENTION

1. Field of the Invention

The present invention relates to a multi-way valve and to a refrigerating machine having a refrigerant circuit in which such a multi-way valve is inserted. Such multi-way valves or refrigerating machines are used, for example, in refrigerators that have a plurality of cooling compartments capable of being regulated respectively by a specific evaporator to temperatures that can be set independently of one another. They serve, there, for apportioning a refrigerant stream coming from an individual compressor to one or more evaporators. Such multi-way valves are configured conventionally mostly as solenoid valves, in which the closing member of a ferromagnetic material is changed over, as a result of the action of the magnetic field of an electromagnet, between two different rest positions, in which it in each case blocks one of the two possible paths of the refrigerant through the valve. To achieve a good leaktightness of the solenoid valve in its various switching positions, the closing member must, at rest, be pressed against its seat with not too low a force; during the changeover of the valve, the force has to be overcome to bring the closing member into a new position. The higher the closing force is, the larger, the more powerful, and, correspondingly, the more costly is the electromagnet required for this purpose.

SUMMARY OF THE INVENTION

It is accordingly an object of the invention to provide a pneumatically actuated multi-way valve and refrigerating machine with multi-way valve that overcome the hereinafore-mentioned disadvantages of the heretofore-known devices of this general type and in which the closing member can be changed over without a magnetic force being used and that can be manufactured cost-effectively in large quantities.

With the foregoing and other objects in view, there is provided, in accordance with the invention, a multi-way valve, including a housing having at least one inlet and at least one outlet and defining a chamber having a plurality of seats respectively associated with each of the at least one inlet and the at least one outlet, closing members associated with each of the seats, and a cell extendable and compressible under action of a control pressure, the cell coupled to the closing members and respectively shutting off or opening an associated one of the seats dependent upon one of a compression movement of the cell and an extension movement of the cell.

In accordance with another feature of the invention, instead of magnetic force, to drive the movement of the closing members, the multi-way valve according to the invention utilizes the deformation of a cell extendable and compressible under the action of a control pressure.

In accordance with a further feature of the invention, there is provided an external reversible gas generator and gas absorber, the cell being connected to the external reversible gas generator and gas absorber.

In accordance with an added feature of the invention, the reversible gas generator and gas absorber is disposed in the cell.

The reversible gas generator and gas absorber, which functions as source of the control pressure, may be disposed externally, outside the cell or the valve housing, or, else, internally inside the cell.

In accordance with an additional feature of the invention, the ends of the cell that move in opposition during the compression and extension of the cell can be used to drive opposite movements of a first and a second closing member of the multi-way valve. In such a case, the cell is, expediently, connected to the housing at a point located between these two ends.

To keep the structure of the valve simple and so as not to have to use any deflecting members or levers for transmitting the movements of the ends of the cell to the closing members, in accordance with yet another feature of the invention, the valve seats associated with the first and with the second closing member are disposed in the same side wall of the housing.

Alternatively, in accordance with yet a further feature of the invention, there is the possibility of connecting one of the two ends of the cell that are opposite one another in the direction of extension to the housing and of coupling the other to a first and a second closing member. In such a case, a simple structure of the multi-way valve is obtained when the valve seats associated with the first and the second closing member are disposed in side walls of the housing that are located opposite one another.

In accordance with yet an added feature of the invention, the seats are two seats, the closing members are a first and second closing member disposed in the chamber and having parts associated with a respective one of the two seats, and one of the two ends is connected to the housing and another of the two ends is coupled to the first and second closing member.

In accordance with yet an additional feature of the invention, the housing has side walls including at least two side walls disposed opposite one another and the seats associated with the closing members are disposed in the at least two side walls.

In accordance with again another feature of the invention, the housing has side walls including at least two side walls disposed opposite one another and the seats are two seats respectively associated with the first and second closing members and are disposed in the at least two side walls.

In accordance with again a further feature of the invention, the housing has side walls including at least two side walls disposed opposite one another and the seats associated with the first and the second closing members are disposed in the at least two side walls.

In accordance with again an added feature of the invention, the first and the second closing members are connected in one piece.

In accordance with again an additional feature of the invention, the first and second closing members are connected rigidly to a respective one of the two ends of the cell.

In accordance with still another feature of the invention, the closing members are connected rigidly to a respective one of the two side walls of the cell.

In accordance with still a further feature of the invention, the cell is configured, preferably, as a bellows, that is to say, with wavy side walls connecting the two ends.

In accordance with still an added feature of the invention, the housing has at least two outlets and the chamber has a plurality of seats respectively associated with each of the at least two outlets.

With the objects of the invention in view, in a refrigerating machine having a refrigerant circuit with a plurality of evaporators there is also provided a switching device including a multi-way valve disposed in the refrigerant circuit and fluidically connected to at least one of the evaporators, the multi-way valve having a housing having at least one inlet and at least one outlet, the at least one inlet and at least one outlet fluidically connected to the refrigerant circuit and defining a chamber having a plurality of seats respectively associated with each of the at least one inlet and the at least one outlet and respectively fluidically connected to the at least one inlet and the at least one outlet, closing members associated with each of the seats, and a cell extendable and compressible under action of a control pressure, the cell coupled to the closing members and respectively shutting off or opening an associated one of the seats dependent upon one of a compression movement of the cell and an extension movement of the cell.

In accordance with a concomitant feature of the invention, the at least one inlet is one inlet and the at least one outlet is two outlets.

Other features that are considered as characteristic for the invention are set forth in the appended claims.

Although the invention is illustrated and described herein as embodied in a pneumatically actuated multi-way valve and refrigerating machine with multi-way valve, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
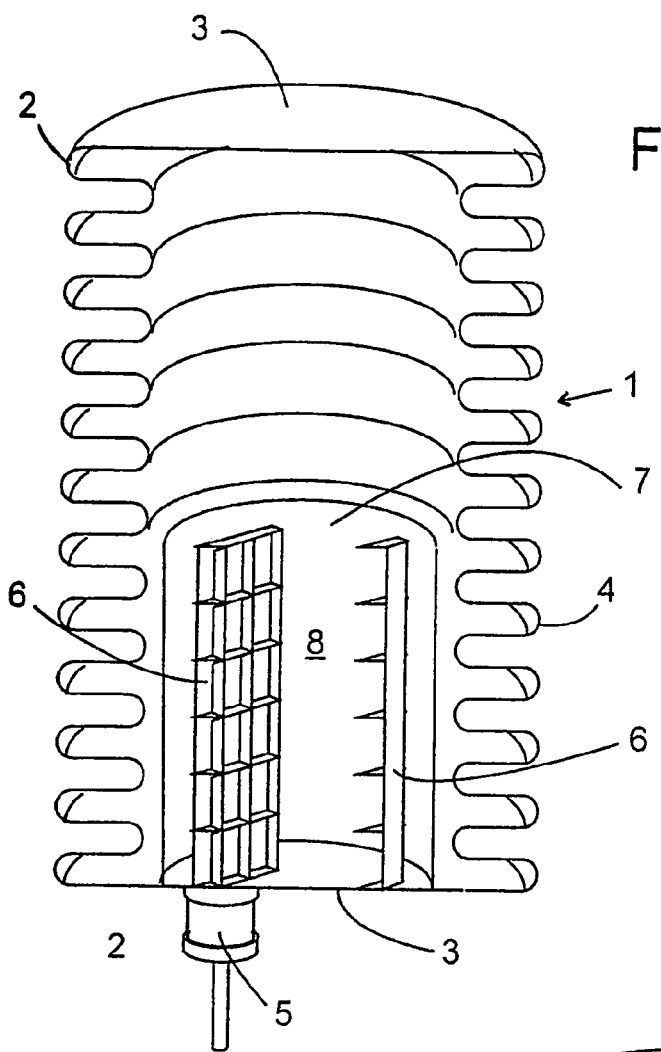
FIG. 1 is a partially cross-sectional and partially perspective view of a cell for a multi-way valve according to the invention in an extended state.
Figure 2:
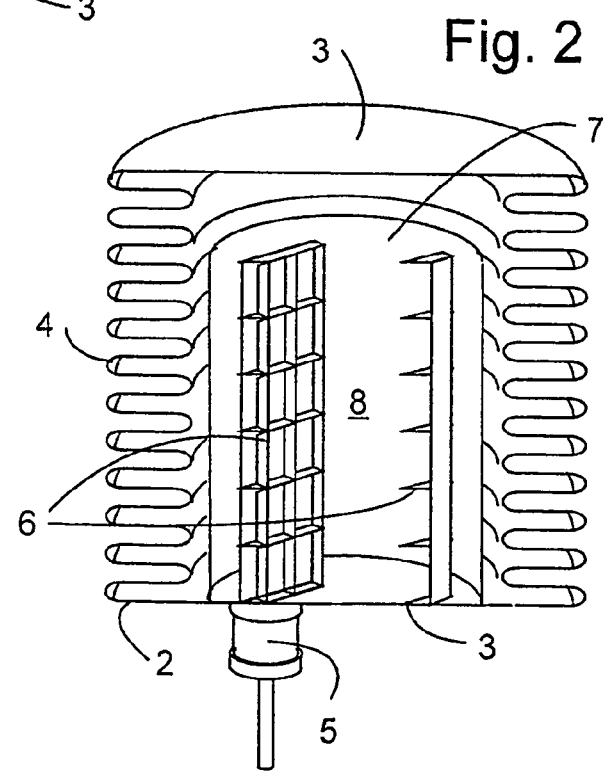
FIG. 2 is a partially cross-sectional and partially perspective view of a cell for a multi-way valve according to the invention in a compressed state.

Referring now to the figures of the drawings in detail and first, particularly to FIGS. 1 and 2 thereof, there is shown a section through a cell that can be used for the multi-way valve according to the invention. The hermetically leak-tight outer casing of the cell 1 is constructed as a bellows 2 of metal, with two opposite end or fore faces 3 that are connected by a cylindrical, wavy, and, therefore, extendable and compressible side wall 4. Two current leadthroughs 5, only one of which is shown in FIGS. 1 and 2, extend through the lower end face 3 of the cell 1 and respectively act upon one of two electrodes 6 inside the cell 1. The electrodes 6 and a non-illustrated electrolyte disposed between the electrodes 6 function as a rechargeable electrochemical cell that functions as a reversible gas generator 8 and gas absorber, in that gaseous hydrogen is released during the operation of charging the gas generator 8 and is consumed during discharge. That is to say, a charging current applied to the gas generator 8 from outside gives rise in the generator 8 to the release of hydrogen into the cell 1 and, due to the control pressure generated by the hydrogen, an extension dependent on the applied charge quantity and on the pressure to be overcome outside the cell 1. If, by contrast, a consumer is connected to the current leadthroughs 5 of the cell, a discharge current flows, the hydrogen is absorbed again and the cell 1 is compressed under external pressure acting on the cell 1.

Such cells are offered, for example, by the company FRIWO Silberkraft, Duisburg, and are described, for example, in the journal Elektor, 1/98, page 15. They make it possible, with a diameter and a length of the cell of less than 20 mm, to generate actuating forces of up to 60 N.

The gas generator 8 is surrounded in the cell by a protective casing 7, illustrated in FIGS. 1 and 2 as an open cylinder, which prevents an excessive compression of the cell that could lead to damage to the electrodes 6, in that the protective casing 8, where appropriate, supports the upper end face 3.

FIG. 2 shows the same cell in a compressed state.

Exemplary embodiments of multi-way valves that use the cell shown in FIGS. 1 and 2 or a variant of it are shown in FIGS. 3 to 6, in each case in a diagrammatic section.

Figure 3:
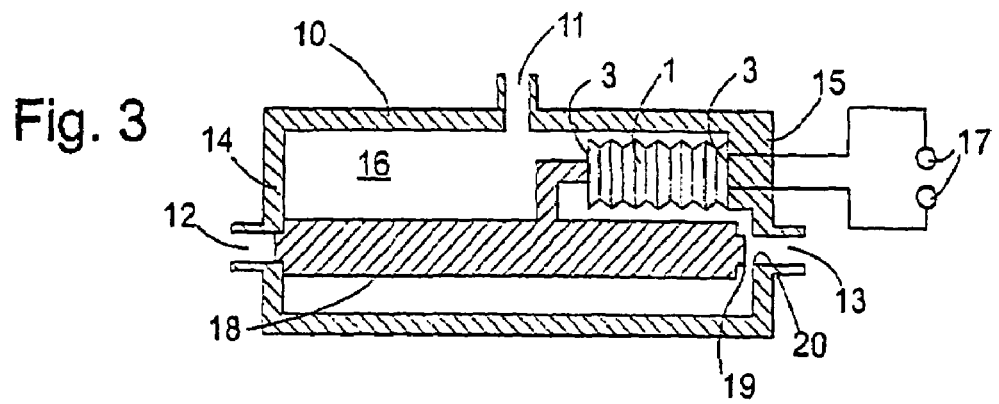
FIG. 3 is a diagrammatic cross-sectional view of a second embodiment of a multi-way valve according to the invention.

The multi-way valve of FIG. 3 has a housing 10 with an inlet 11 and with two outlets 12, 13 on side walls 14, 15. of the housing 10 that are located opposite one another.

A cell 1 of the type shown in FIGS. 1 and 2 is disposed in a chamber 16 inside the housing 10. One of the end faces 3 of the cell 1 is connected firmly to the side wall 15, through which the current leadthroughs of the cell 1 also extend to two external connections 17. A current source for extending the cell 1 or a consumer for compressing the cell 1 can be connected selectively to the connections 17 through a non-illustrated switch. The connections 17 may also be unconnected to maintain a current length of the cell 1.

A body 18 mounted displaceably between the side walls 14, 15 is connected rigidly to the second end face 3 of the cell 1. The body 18 is slightly shorter than the distance between the side walls 14, 15 of the chamber 16 and can be moved as a result of the extension or compression of the cell 1 between two stop positions, in which, in each case, at an end, facing an outlet 12 or 13 of the body 18, a closing member 19 closes a valve seat 20 of the outlet 12, 13. The freedom of movement of the body 18 may be of the order of two mm, for example.

FIG. 3 shows the extended state of the cell 1, in which the body 18 shuts off the outlet 12 remote from the cell 1; as a result of a compression of the cell 1, the outlet 12 is opened and the outlet 13 adjacent to the cell 1 is closed.

Figure 4:
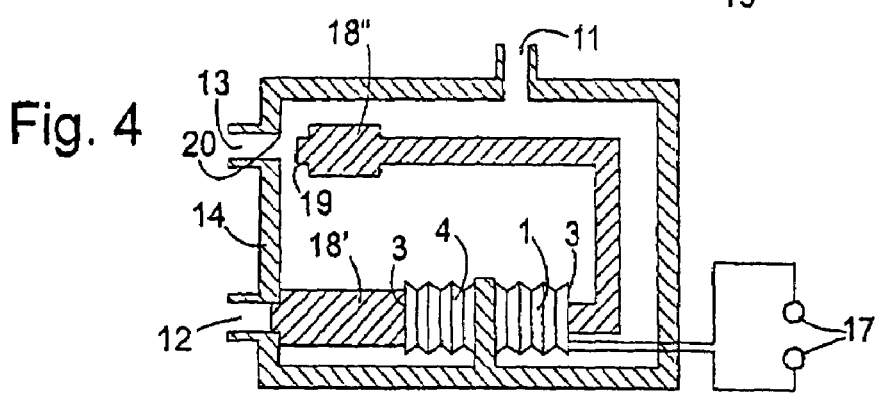
FIG. 4 is a diagrammatic cross-sectional view of a third embodiment of a multi-way valve according to the invention.

In the embodiment of FIG. 4, the cell 1 is connected in a middle region of each side wall 4 to the housing 10 of the valve, and the two end faces 3 have fastened to them a rigid body 18', 18", of which one 18' runs in a straight line to the associated outlet 12 of the housing and the other 18" extends in a U-shaped curve to the second outlet 13 that is disposed in the same side wall 14 of the outlet 12. In the extended state of the cell 1, as shown in FIG. 4, the closing member of the body 18' shuts off the valve seat of the outlet 12, while the closing member 19 of the body 18" is separated from the valve seat 20 of the outlet 13. When the cell is compressed due to the connection of a consumer to the connections 17, the body 18' moves away from the outlet 12 and frees the latter, while, at the same time, the body 18" closes the outlet 13.

Figure 5:
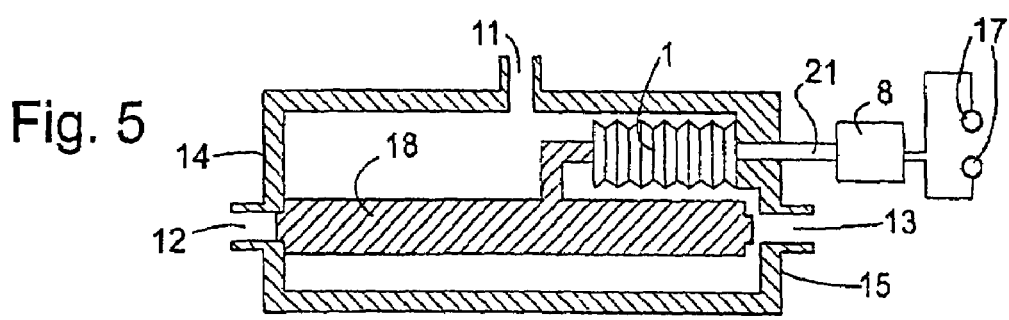
FIG. 5 is a diagrammatic cross-sectional view of a fourth embodiment of a multi-way valve according to the invention.
Figure 6:
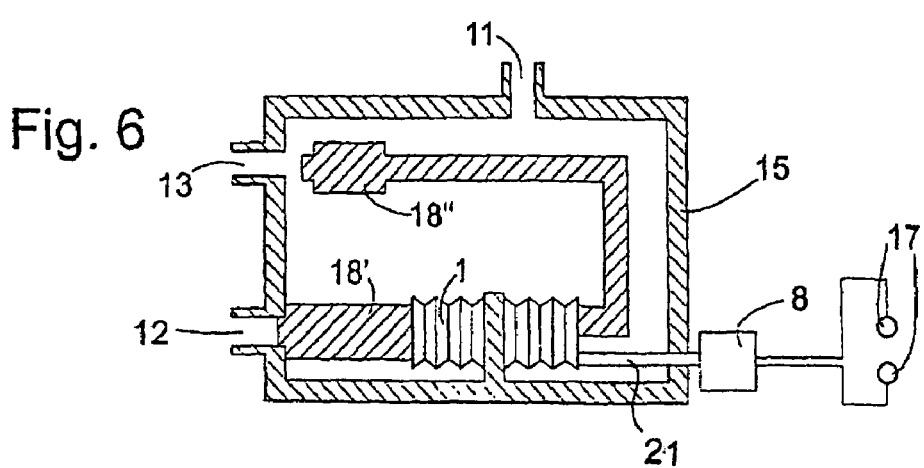
FIG. 6 is a diagrammatic cross-sectional view of a fifth embodiment of a multi-way valve according to the invention.

The embodiments of FIGS. 5 and 6 differ from those of FIGS. 3 and 4 in each case in that the gas generator 8 is disposed outside a cell 1 mounted in the chamber 16. Instead of the current leadthroughs, in each case, a gas line 21 extends through the side wall 15 of the housing between the cell 1 and the gas generator 8. The functioning of the valves according to FIGS. 5 and 6 is the same as described above for FIGS. 3 and 4.

The multi-way valves according to FIGS. 3 to 6 are suitable for switching the refrigerant stream in a refrigerating machine having a compressor and a plurality of evaporators because the pressure of 8 to 16 bar typically prevailing in the refrigerant circuit of such a machine is capable of ensuring a reliable compression of the bellows 2.

We claim:

1. A multi-way valve, comprising:
a housing having at least one inlet and at least one outlet and defining a chamber having a plurality of seats respectively associated with each of said at least one inlet and said at least one outlet;
closing members associated with each of said seats; and
a cell extendable and compressible under action of a control pressure, a reversible gas generator and gas absorber in said cell providing said control pressure, said cell coupled to said closing members and respectively shutting off or opening an associated one of said seats dependent upon one of a compression movement of the cell and an extension movement of the cell.

2. The multi-way valve according to claim 1, further comprising an external reversible gas generator and gas absorber, said cell being connected to said external reversible gas generator and gas absorber.

3. The multi-way valve according to claim 1, wherein:
said cell has a direction of extension and compression and two ends opposite one another in said direction of extension;
said closing members are first and second closing members disposed in said chamber and coupled respectively to said two ends; and
said cell is connected to said housing at a point located between said two ends.

4. The multi-way valve according to claim 3, wherein:
said housing has side walls; and
said seats are valve seats associated with said first and second closing members and are disposed in the same side wall of said housing.

5. The multi-way valve according to claim 1, wherein:
said cell has a direction of extension and compression and two ends opposite one another in said direction of extension;
said closing members are first and second closing members disposed in said chamber; and
one of said two ends is fixedly connected to said housing and another of said two ends is coupled to said first and second closing members.

6. The multi-way valve according to claim 1, wherein:
said cell has a direction of extension and compression and two ends opposite one another in said direction of extension;
said seats are two seats;
said closing members are a first and second closing member disposed in said chamber and having parts associated with a respective one of said two seats; and
one of said two ends is connected to said housing and another of said two ends is coupled to said first and second closing member.

7. The multi-way valve according to claim 1, wherein:
said housing has side walls including at least two side walls disposed opposite one another; and
said seats associated with said closing members are disposed in said at least two side walls.

8. The multi-way valve according to claim 3, wherein:
said housing has side walls including at least two side walls disposed opposite one another; and
said seats are two seats respectively associated with said first and second closing members and are disposed in said at least two side walls.

9. The multi-way valve according to claim 5, wherein:
said housing has side walls including at least two side walls disposed opposite one another; and
said seats associated with said first and the second closing members are disposed in said at least two side walls.

10. The multi-way valve according to claim 7, wherein said first and the second closing members are connected in one piece.

11. The multi-way valve according to claim 8, wherein said first and the second closing members are connected in one piece.

12. The multi-way valve according to claim 9, wherein said first and the second closing members are connected in one piece.

13. The multi-way valve according to claim 3, wherein said first and second closing members are connected rigidly to a respective one of said two ends of said cell.

14. The multi-way valve according to claim 5, wherein said first and second closing members are connected rigidly to a respective one of said two ends of said cell.

15. The multi-way valve according to claim 6, wherein said first and second closing members are connected rigidly to a respective one of said two ends of said cell.

16. The multi-way valve according to claim 7, wherein said closing members are connected rigidly to a respective one of said two side walls of said cell.

17. The multi-way valve according to claim 1, wherein said cell is a bellows.

18. The multi-way valve according to claim 1, wherein said cell has a bellows shape.

19. The multi-way valve according to claim 1, wherein:
said housing has at least two outlets; and
said chamber has a plurality of seats respectively associated with each of said at least two outlets.

20. The multi-way valve according to claim 1, wherein:

said cell has a direction of extension and compression and two ends opposite one another in said direction of extension;

said closing members are first and second closing members on opposite ends of an elongated displaceable body disposed in said chamber; and a first one of said two cell ends rigidly connected to said housing and the second one of said two cell ends rigidly connected to said first and second closing members.

21. The multi-way valve according to claim 20, wherein:

said cell is a bellows type cell;

said housing has at least a pair of side walls disposed opposite one another; and said seats associated with said closing members are disposed in said at least opposite two side walls.

* * * * *